T. LARSSON.
FLOW REGULATOR.
APPLICATION FILED JULY 29, 1904. RENEWED JAN. 21, 1910.

963,906.

Patented July 12, 1910.
2 SHEETS—SHEET 1.

Witnesses:
C. F. Wesson
M. C. Regan

Inventor:
T. Larsson.
By his Attorneys,
Luthgate & Luthgate

UNITED STATES PATENT OFFICE.

THURE LARSSON, OF WORCESTER, MASSACHUSETTS, ASSIGNOR TO HIMSELF, WILLIAM E. D. STOKES, OF NEW YORK, N. Y., AND FRED A. JONES, OF WORCESTER, MASSACHUSETTS.

FLOW-REGULATOR.

963,906.   Specification of Letters Patent.   Patented July 12, 1910.

Application filed July 29, 1904, Serial No. 218,662. Renewed January 21, 1910. Serial No. 539,307.

*To all whom it may concern:*

Be it known that I, THURE LARSSON, a subject of the King of Sweden, residing at Worcester, in the county of Worcester and State of Massachusetts, have invented a new and useful Flow-Regulator, of which the following is a specification.

This invention relates to a construction for automatically controlling the flow of water or other liquid passing through a pipe.

The especial object of this invention is to provide a simple, inexpensive and efficient regulator for controlling the flow of water so as to automatically cut off the supply when the flow exceeds the desired amount within a given time.

To these ends this invention consists of the flow regulator as an article of manufacture, and of the combinations of parts therein as hereinafter described and more particularly pointed out in the claims at the end of this specification.

A flow regulator constructed according to this invention has been especially designed for use in connection with a hydraulic elevator.

Figure 1:
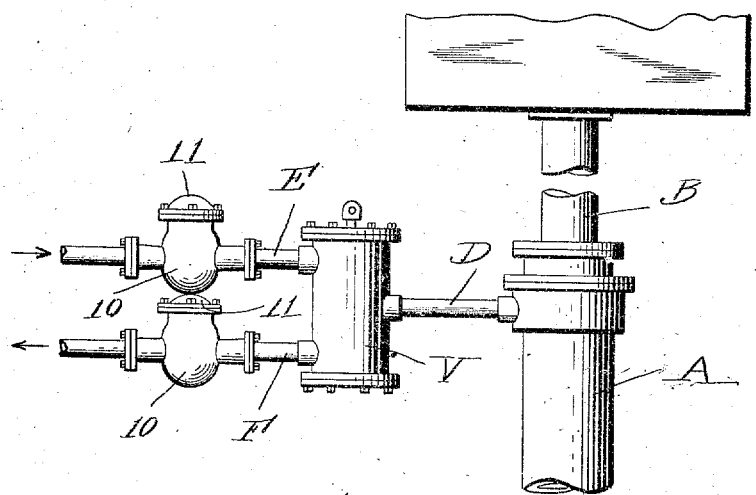
Figure 2:
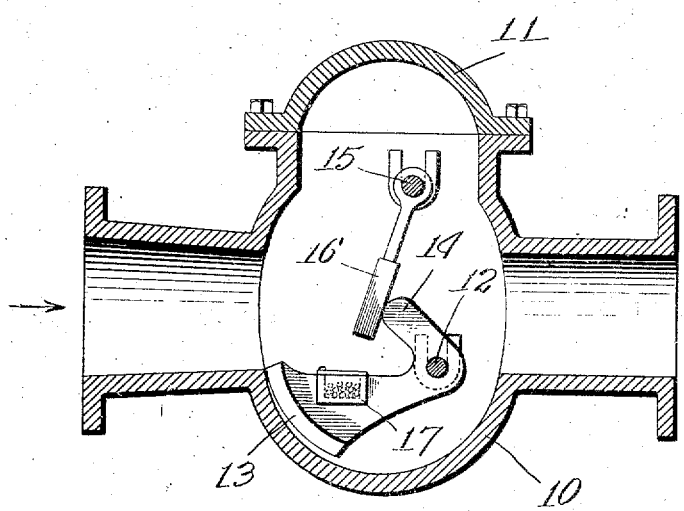
Figure 3:
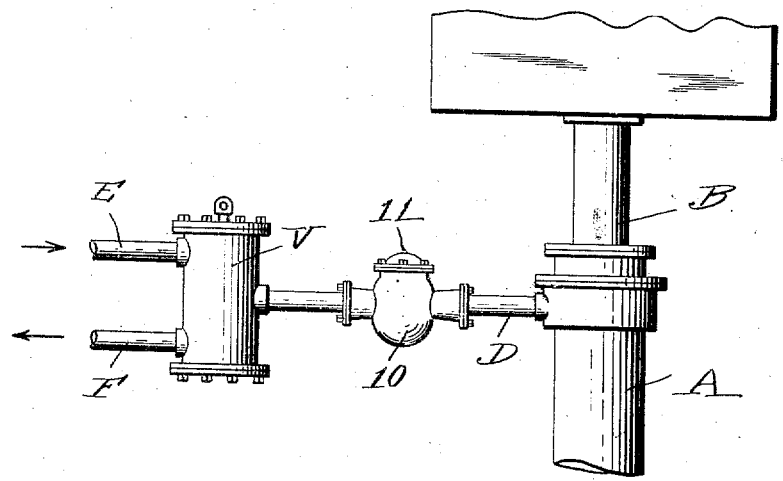
Figure 4:
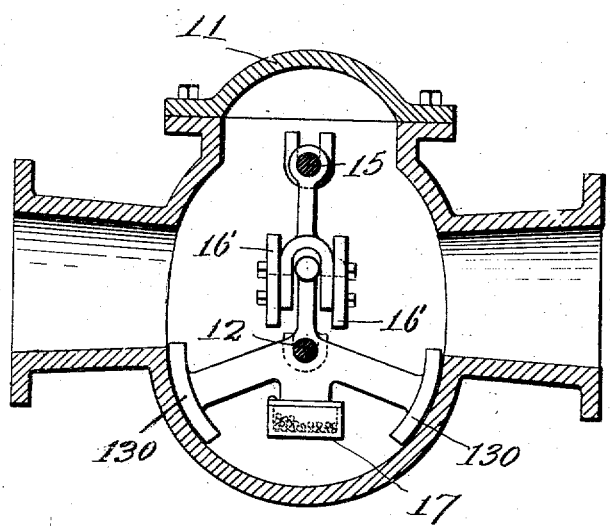

In the accompanying two sheets of drawings, Figure 1 is a side view of sufficient parts of a hydraulic elevator plant to illustrate the application of flow regulators constructed according to this invention to the inlet and outlet pipes thereof. Fig. 2 is an enlarged sectional view of one of the flow regulators. Fig. 3 is a side view of sufficient parts of a hydraulic elevator plant to illustrate the application of a flow regulator constructed according to this invention to the to-and-from pipe, and Fig. 4 is an enlarged sectional view illustrating the double flow regulator which I preferably employ in connection with the to-and-from pipe.

In the elevator construction illustrated in Figs. 1 and 3, I have shown an ordinary form of direct plunger elevator.

In the drawings A designates a casing, and B the plunger which runs in the casing A and supports the elevator car. Connected with the casing A is a to-and-from pipe D which is connected by an ordinary controlling valve V either with an inlet pipe E or an outlet pipe F. These parts may be of any of the ordinary or approved constructions and need not be herein described at length.

The flow regulators constructed according to this invention when used in connection with hydraulic elevators control the speed at which the water is supplied to or exhausted from the elevator plant, and constitute in effect governors for limiting the speeds at which the elevator-cars may be operated.

A flow regulator is preferably employed in connection with both the inlet and outlet pipe of an elevator plant, as illustrated in Fig. 1, the flow regulator in the inlet pipe controlling the speed at which the car may be lifted, while the flow regulator in the outlet pipe F controls the speed at which the car descends. Each of these regulators, as illustrated in Fig. 2, comprises a casing 10 with flanged pipes projecting therefrom for connecting the casing to the piping in the ordinary manner.

The top of the casing is closed by a cover 11 which may be removed when it is desired to obtain access to the inside of the casing.

Cast upon or formed with the side walls of the casing are two sets of bearings. Pivotally mounted in the lower set of bearings is a rock-shaft 12 carrying a bell-crank lever, one arm of which supports the cut-off gate 13, while the other arm 14 of the lever projects out in position to be operated to raise the cut-off gate and limit the supply of water flowing through the casing.

Journaled in the upper set of bearings is a rock-shaft 15 which supports the impact plate 16 which rests upon and operates the arm 14 of the rock-shaft.

A flow regulator as thus constructed is operated by the impact or energy of the flowing stream of water passing through the casing. That is to say, the impact of the stream of water acting upon the plate 16 will tend to raise the shut-off gate 13 so as to restrict the opening into the valve casing and limit the amount of water which can pass through the construction within a given time. The plate 16 is arranged substantially transversely or at right-angles to the flow, so that a positive action will be obtained.

To provide for adjusting the construction to produce different controlling effects, the cut-off gate 13 may be weighted. For example, small shot or pellets may be inclosed in a box 17, and in order to counter-balance or weight the shut-off gate to the desired extent the cover 11 of the valve casing may be opened and the counter-weighting pellets may either be removed or dropped into place as required.

In a flow regulator as thus constructed it will be seen that all operative parts are completely inclosed; that no stuffing boxes or other forms of packings are required; and that an efficient control of a stream of water is secured.

In some cases instead of employing one flow regulator in the inlet pipe, and a second flow regulator in the outlet pipe, I may employ a double acting flow regulator which may be located in the to-and-from pipe. I have illustrated such a construction in Figs. 3 and 4. As shown in these figures, a double acting regulator constructed according to this invention may comprise a casing 10 and cover 11 substantially of the same construction as illustrated in the first sheet of drawings.

Journaled in the lower set of bearings of the casing is a rock-shaft carrying two cut-off gates 130, one serving to close the inlet and the other the outlet from the casing. Also extending up from the rock-shaft is a central arm which fits into a fork extending down from the rock-shaft in the upper set of bearings.

Carried by the fork are two impact plates, one serving to close one shut-off gate 130 when the flow exceeds the desired rate in one direction, while the other impact plate operates to close the other shut-off gate 130 when the flow is too rapid in the opposite direction.

The parts may be counter-balanced and held in central position by shot or weighting pellets 17 which may be dropped into a central receptacle as shown.

I am aware that changes may be made in the construction of flow regulators by those who are skilled in the art without departing from the scope of my invention as expressed in the claims. I do not wish, therefore, to be limited to the constructions I have herein shown and described, but What I do claim and desire to secure by Letters Patent of the United States is:—

1. In a flow regulator, the combination of a casing, a cut-off gate located therein for controlling the flow, and an impact plate arranged in said casing transversely to the flow and adapted to engage the cut-off gate.

2. In a flow regulator, the combination of a casing, a counter-weighted cut-off gate for controlling the flow, and an impact plate arranged to operate the cut-off gate, the parts being arranged entirely within the casing.

3. In a flow regulator, the combination of a casing having two sets of bearings therein, a shaft mounted in the lower set of bearings with arms projecting therefrom carrying a cut-off gate and coöperating with an impact plate respectively, and a shaft journaled in the upper set of bearings and carrying an impact plate for closing the shut-off gate.

4. In a compound flow regulator, the combination of a casing having two sets of bearings, a shaft journaled in the lower set of bearings, arms extending from said shaft and carrying cut-off gates, and an upwardly extending arm engaging a fork extending down from a shaft journaled in the upper set of bearings, with impact-plates carried by said fork, said parts being arranged so that one cut-off gate will tend to be closed when the flow exceeds the desired rate in one direction, while the other cut-off gate will tend to be closed when the flow exceeds the desired rate in the other direction.

5. In a flow regulator, the combination of a casing, two transverse shafts therein, a bell-crank journaled on one of said shafts, a cut-off gate on one arm of the bell-crank, and an impact plate journaled on the other shaft and adapted to engage the other arm of the bell-crank and to turn the same on its shaft.

6. In a flow regulator, the combination of a bell-crank journaled on an axis transverse to the direction of flow, a cut-off gate on one arm of the bell-crank, and an impact plate journaled on an axis above the first mentioned axis and parallel therewith, said impact plate being adapted to engage the other arm of the bell-crank and operate the cut-off gate.

In testimony whereof I have hereunto set my hand, in the presence of two subscribing witnesses.

THURE LARSSON.

Witnesses:
Louis W. Southgate,
Angie M. Goddard.